(12) United States Patent
Wiedenmann (10) Patent No.: US 8,051,917 B2
(45) Date of Patent: Nov. 8, 2011

(54) SOIL TREATMENT APPARATUS

(75) Inventor: Georg Wiedenmann, Rammingen (DE)

(73) Assignee: Wiedenmann GmbH, Rammingen Krs. Ulm (DE)

( * ) Notice: Subject to any disclaimer, the term of this patent is extended or adjusted under 35 U.S.C. 154(b) by 50 days.

(21) Appl. No.: 12/401,199

(22) Filed: Mar. 10, 2009

(65) Prior Publication Data

US 2009/0223686 A1  Sep. 10, 2009

(30) Foreign Application Priority Data

Mar. 10, 2008  (DE) .......................... 10 2008 013 350
Apr. 4, 2008   (DE) .......................... 10 2008 017 242

(51) Int. Cl.
*A01B 45/02*  (2006.01)
(52) U.S. Cl. ........................................... 172/21
(58) Field of Classification Search ............... 172/21, 172/22, 88, 92, 94, 95, 417, 484
See application file for complete search history.

(56) References Cited

U.S. PATENT DOCUMENTS

| | | | | |
|---|---|---|---|---|
| 994,321 A * | 6/1911 | Klaus | | 172/84 |
| 2,347,748 A * | 5/1944 | Melling | | 172/21 |
| 3,878,899 A * | 4/1975 | Jones | | 172/21 |
| 4,422,510 A * | 12/1983 | de Ridder | | 172/21 |
| 4,632,189 A | 12/1986 | Rizzo | | |
| 4,750,565 A * | 6/1988 | Hansen et al. | | 172/22 |
| 4,753,298 A * | 6/1988 | Hansen et al. | | 172/22 |
| 5,193,624 A | 3/1993 | Wiedenmann | | |
| 5,570,746 A * | 11/1996 | Jones et al. | | 172/22 |
| 5,709,272 A | 1/1998 | Jones et al. | | |
| 5,797,458 A * | 8/1998 | Simon et al. | | 172/2 |
| 5,810,092 A * | 9/1998 | Selvatici | | 172/94 |
| 5,988,290 A * | 11/1999 | Banks | | 172/21 |
| 6,003,613 A * | 12/1999 | Reincke | | 172/21 |
| 6,199,637 B1 | 3/2001 | Wiedenmann | | |
| 7,267,181 B2 * | 9/2007 | Banks | | 172/21 |
| 2005/0178567 A1 | 8/2005 | Wiedenmann | | |
| 2009/0200050 A1 * | 8/2009 | Bos | | 172/21 |

FOREIGN PATENT DOCUMENTS

| | | |
|---|---|---|
| DE | 10 2004 018 591 A1 | 11/2005 |
| DE | 10 2005 021 025 A1 | 10/2006 |
| EP | 0 452 449 B1 | 6/1996 |
| EP | 0 791 284 A1 | 8/1997 |
| EP | 0 924 975 B1 | 11/2000 |
| EP | 1 108 350 A1 | 6/2001 |
| EP | 0 853 869 B1 | 3/2002 |

(Continued)

*Primary Examiner* — Robert Pezzuto
*Assistant Examiner* — Matthew Troutman
(74) *Attorney, Agent, or Firm* — Global IP Counselors, LLP (57) ABSTRACT

A soil treatment apparatus has a plurality of tool units that have at least one bracket, at least one plunger tool and at least one stop for the plunger tool. The bracket with an end section on a chassis is driven up and down to pivot about a first pivoting axis. The plunger tool device is linked at another end section of the bracket to pivot about a second pivoting axis. The stop is formed such that plunging is carried out at a predefined plunging angle. To enable faster operating speeds, the first pivoting axis is provided behind the second pivoting axis as seen in a driving direction, and the plunger tool device is linked such that whenever the bracket is pivoted about the first pivoting axis it is subjected to a centrifugal force in a direction toward a position limited by the stop.

17 Claims, 5 Drawing Sheets

FOREIGN PATENT DOCUMENTS

| | | |
|---|---|---|
| EP | 1 208 730 A1 | 5/2002 |
| EP | 1 210 853 A1 | 6/2002 |
| EP | 1 040 741 B1 | 9/2004 |
| GB | 2 287 167 A | 9/1995 |
| JP | S57-029962 B2 | 6/1982 |
| WO | WO-03/096784 A1 | 11/2003 |
| WO | WO-2006/102869 A1 | 10/2006 |

* cited by examiner

SOIL TREATMENT APPARATUS

CROSS-REFERENCE TO RELATED APPLICATIONS

This application claims priority under 35 U.S.C. §119 to German Patent Application No. 10 2008 013 350.7, filed Mar. 10, 2008, and German Patent Application No. 10 2008 017 242.1, filed Apr. 4, 2008. The entire disclosures of German Patent Application Nos. No. 10 2008 013 350.7 and 10 2008 017 242.1 are hereby incorporated herein by reference.

BACKGROUND OF THE INVENTION

1. Field of the Invention

This invention generally relates to a soil treatment apparatus. More specifically, the present invention relates to a soil treatment apparatus traversable across the soil in a driving direction.

2. Background Information

A soil treatment apparatus is traversable across the soil in a driving direction. This can be realized, for example, by configuring the soil treatment apparatus for linkage mounting on a tractor, or to form it as an automotive unit, or even as a push unit for pushing from behind or as a pull unit for pulling in front or, more generally, as a hand-operated apparatus.

The soil treatment apparatus is provided, in particular, for soil aeration and has a plurality of tool units for this purpose. From U.S. Pat. No. 4,632,189, a soil treatment apparatus having plunger tools moveable up and down by means of a bracket is known. Here again, a plurality of tool units is provided. A single stop beam against which all plunger tools abut, is also pivotally linked to the chassis. The stop beam has only two possible positions, as it is pivotal between an operating position and a rest position. In the rest position all plunger tools are folded to the top, so that the brackets can be further driveably moved without the plunger tools plunging. This has the sole purpose of driving across the soil without the plunging function, for example, when a paved path or the like has to be crossed. This construction entails that the plunger tools rub along the stop common to all plunger tools, which is a drawback with respect to abrasive wear. Moreover, no well-defined plunging angle is achievable with such a construction; plunging is always carried out only with the plunger tools sliding on the stop beam, so that the plunging angle depends on the bracket position and the distance from the soil. Moreover, the brackets are biased against an eccentric shaft by means of a biasing device, which serves to create the up and down movement. This construction is unsuitable for higher speeds, since there is a risk that the brackets are no longer guided on the eccentric disk, at least intermittently, but flung off from the latter. In the context of the plunging function, this entails the risk of extremely hard knocks on the eccentric shaft, which makes faster operation impossible. This is why this apparatus is configured for the walking speed of an operator moving the apparatus.

To make soil treatment quicker and in particular with a defined plunging angle, further developed soil treatment apparatuses have been proposed, as they are described and shown in EP 1 210 853 A1, EP 1 208 730 A1, EP 0 853 869 B1, EP 1 108 350 A1, EP 1 040 741 B1, EP 0 924 975 B1, EP 0 452 449 B1, WO 03/096784 A1, DE 10 2004 018 591 A1 and WO 2006/102869 A1.

These soil treatment apparatuses further developed with respect to the working speed, which are also traversable across the soil in a driving direction, have a plurality of tool units, which also each comprise at least one bracket and at least one plunger tool device. Each of the tool units further has its own stop, however, for the plunger tool device. To enable the plunging movement, the bracket pivots up and down with an end section on the apparatus chassis driven about a first pivoting axis. The plunger tool device is linked on the other end section of the bracket in such a way, that it pivots on the bracket about a second pivoting axis. The stop is formed in such a way that plunging of the plunger tool is carried out at a predefined plunging angle. Driving is by means of a crank drive, the crank linked to the bracket by means of a drive rod.

The soil treatment apparatuses known from the above mentioned references are formed in such a way that the plunger tool is driven into the soil when the bracket is pivoted downward about the first pivoting axis. Herein, the stop of the plunger tool serves to determine the plunging angle. By associating each plunger tool with its own stop the plunging angle can be precisely predetermined and adjusted. As the plunger tool is plunged into the soil and the soil treatment apparatus is driven in the driving direction, the plunger tool device leaves the associated stop due to the resistance in the soil and is pivoted about the second pivoting axis. This is how loosening of the soil is achieved due to pivoting of the plunger tool within the soil. As the bracket is pivoted upward again, the plunger tool is withdrawn from the soil. As soon as it leaves the soil, the plunger tool device, for example due to a biasing device, returns to engagement on the stop. In the soil treatment apparatuses as known from EP 1 108 350 A1, EP 1 040 741 B1, EP 0 924 975 B1 and EP 0 452 449 B1, the stop is arranged to be moved in the area of the second pivoting axis on and together with the other end section of the bracket. In apparatuses as described and shown in principle in EP 0 853 869 B1, a stop resides in the area of a telescopic means moved together with the bracket, which also includes the biasing device.

In all of these faster soil treatment apparatuses, the brackets, with their free end sections, to which the plunger tool is linked, are directed against the driving direction. In other words, the first pivoting axis is in front of the second pivoting axis as seen in the driving direction. The bracket therefore is subjected to tensile stress as the soil treatment apparatus drives on while the plunger tool is stuck in the soil to then withdraw the plunger tool from the soil. This tensile stress has been deemed advantageous in view of a faster operating speed, since fewer shocks overall are transmitted to the apparatus chassis. Attempts have been made, in particular, to absorb these shocks by spring elements to enable even faster operation.

Further approaches for enabling faster operation have been described in WO 2006/102869 A1. Herein, the stop hitherto always moved together with the bracket has been located external to this combined-movement system and is now associated with the fixed chassis. The relative movement of the plunger tool to the bracket is then transmitted by a corresponding drive out of the system pivoted up and down together with the bracket to the fixed system and damped there. This is intended to reduce the moved masses and to make the vibrations in faster operation better manageable. More elaborate damping measures, such as hydraulic damping, thus become possible.

SUMMARY OF THE INVENTION

Based on the previously mentioned documents, each describing stops associated with the individual plunger tool to enable fast operation with a predefined plunger tool plunging angle, it is an object of the present invention to configure a soil treatment apparatus in such a way that faster operation is enabled, while maintaining the possibility of plunging at a predefined plunging angle.

One object of the present invention is to provide a soil treatment apparatus having a plurality of tool units with a defined plunging angle position for each plunger tool.

In the present invention, each tool unit preferably has its own stop in order to provide a defined, preferably adjustable, plunging angle position for each plunger tool. Such apparatuses usually need a biasing device, with which the plunger tool is returned to the stop after withdrawal from the soil. Due to the up and down movement of the brackets, there are centrifugal forces about the first pivoting axis acting on the plunger tool. While these centrifugal forces are of little importance at low speeds, they become more and more important as the operating speeds are increased, since the centrifugal force is proportional to the square of the speed of the pivoting movement.

In the previously explained soil treatment apparatuses, the biasing device must counteract this centrifugal force for each tool unit in order to return the plunger tool into indirect or direct engagement with the associated stop as quickly as possible.

The invention makes use of the idea that, to further increase the speed, the time taken to return the plunger tool to the stop must be kept as short as possible. As a result, with increased operating speeds, counteraction against the centrifugal force is also increased, which also means that the biasing device must be dimensioned correspondingly larger. This increases the moved masses, which in turn prevents a possible acceleration of the operating speed.

Therefore, according to the invention, the arrangement of the prior art apparatus comprising a stop associated with each tool unit is reversed. The brackets now extend with their free end sections, to which the plunger tool is to be linked, in the driving direction and are linked to the chassis frame with their end sections directed against the driving direction. In other words the first pivoting axis is behind the second pivoting axis as seen in the driving direction. Herein, the plunger tool device is linked and formed in such a way that whenever the bracket is pivoted about the first pivoting axis it is subjected to a centrifugal force in the direction towards a position limited by the stop. In this position, in which the plunger tool device engages the stop, it is plunged into the soil. As driving is continued in the driving direction, the plunger tool device leaves its associated stop. If the bracket is then pivoted upward again and the plunger tool is withdrawn from the soil, the centrifugal force acts in such a way in the present embodiment that the plunger tool is brought against its own stop not against the centrifugal force but in the direction of the centrifugal force.

The biasing device can thus be made much smaller or can be omitted altogether. The centrifugal force acts to return the plunger tool to the associated stop and therefore acts to accelerate the movement of the plunger tool back against the stop. In particular, the time in which the plunger tool is not guided by the stop is substantially shortened.

It is true that the reversed bracket orientation with the end section having the plunger tool pointing forward in the driving direction is essentially known from the above mentioned U.S. Pat. No. 4,632,189 and additionally from JP 57-299 62.

However, in the soil treatment apparatus according to U.S. Pat. No. 4,632,189, a biasing device acts not only to return the plunger tool but also to bias the bracket in a sliding attack against the eccentric shaft. Overall, this construction is substantially slower than the soil treatment apparatuses as known, for example, from EP 0 924 975 B1, EP 1 040 741 B1 or EP 0 853 869 B1, and WO 2006/102869 A1. This document therefore does not provide an idea or motivation for an approach to increase the operating speed. Moreover, a common stop is shown for all tool units therefore resulting in a correspondingly undefined plunging angle, and is also only realizable with frictional stresses, which also have a negative effect on the operating speed.

The apparatus according to JP 57-299 62 has not only one, but two parallel acting brackets, wherein a biasing device is associated with both brackets. The plunger tool is positively guided by a crank and a screw, i.e. the plunger tool has a different orientation depending on the crank shaft position.

The crank actively pivots the plunger tool plunged in the soil. The positive adjustments initiated by the crank are enabled via a bracket extensible in a telescopic manner. There is therefore no stop in this configuration, which enables a defined plunging angle position. Moreover, this construction does not allow the centrifugal force to be used for returning the plunger tool to the stop.

However, with the configuration according to the present invention a soil treatment apparatus with a plurality of tool units and at least one stop per each tool unit, against which the plunger tool device is brought after the plunger tool leaves the soil can be configured to withstand faster speeds overall. Thus the centrifugal force no longer counteracts a return of the plunger tool against the stop, but is rather utilized for returning it in an advantageous manner.

Overall, the operating speed can be thus further increased. Surprisingly, the reversal of the bracket orientation has no negative consequences on the shocks to be absorbed, so that the machine can be constructed for substantially higher operating speeds overall.

The plunger tool device can have a plunger tool which is linked to the bracket pivotal about the second pivoting axis. In a preferred embodiment the plunger tool device has a plunger tool holder linked to the bracket pivotal about the second pivoting axis. A plunger tool can therefore be attached to the plunger tool holder, in particular in an exchangeable manner.

In order to use the centrifugal force in an advantageous manner for bringing back the plunger tool device into engagement with the associated stop, there must be a certain unbalance of the plunger tool device with respect to the second pivoting axis. This does not mean, that the entire plunger tool device must be unbalanced, it is sufficient if only a partial element, on which a plunger tool is linked or linkable, pivoting about the second pivoting axis, is configured in a corresponding eccentric manner in such a way that the centrifugal force acts to return the plunger tool device to its position limited by the stop. For this purpose it is provided according to a preferred embodiment that the center of gravity of the plunger tool device and/or of the partial element linked to the bracket and pivotal about the second pivoting axis, of the plunger tool device lies outside the second pivoting axis. Preferably the center of gravity is configured so that it is below the second pivoting axis.

In the configuration according to the present invention, the centrifugal force already provides a returning moment for bringing back the plunger tool device to its position limited by the stop. Embodiments are therefore conceivable in which the biasing device is omitted. Herein, for example, this position could be limited by a detent element or the like, wherein the plunged plunger tool is moved beyond the detent means leaving the stop engagement position as the soil treatment apparatus drives on and is then flung back by the centrifugal force as it is withdrawn and is arrested again.

A more reliable operation is achieved with a biasing device for biasing the plunger tool device against the stop as known as such from the prior art soil treatment apparatus. This biasing device can include spring elements, such as pressure springs or tensile springs, in particular. Since the centrifugal force is also utilized in the configuration according to the present invention, which is increased quadratically as the pivoting speed of the bracket about the first pivoting axis is increased, the biasing device can be dimensioned substantially smaller overall. The biasing device can have a spring configured to be moved together with the bracket. However, as is basically also known from WO 2006/102869 A1, the biasing device can also be arranged outside of the system moved together with the bracket, for example linked to the chassis and immoveable with respect to the latter. For springs moving together with the bracket, in particular tensile springs are preferred as biasing elements, which are arranged, for example, above or laterally to the bracket.

To fulfil the functions of abutting against the stop, biasing, if necessary, against the stop, and linking the plunger tool, the plunger tool device can have a lever element, comprising a first lever arm and a second lever arm, wherein the plunger tool is linkable or linked to the first lever arm. This lever element can be formed integral with a plunger tool holder. The biasing device can preferably act on the second lever arm. Moreover, the stop can indirectly or directly act on the second lever arm. Alternatively, a third lever arm can also be provided for cooperation with the stop.

The stop can be arranged to be moved together with the bracket or can be arranged outside the system moving together with the bracket. In the latter case, a transmission is provided to transmit the relative movement between the plunger tool device and the bracket from the system moved together with the bracket into the immovable system. More details can be found in WO 2006/102869 A1, to which explicit reference is made.

Possible configurations for the stop moving together with the bracket can be derived from EP 1 108 350 A1, EP 1 040 741 B1, EP 0 924 975 B1, EP 0 452 449 B1, WO 03/096784 A and EP 0 853 869 B1.

To keep the predefined angular plunger position even at different working heights and therefore different plunging depths, it is further preferred that the plunger tool device is guided and formed in such a way that an orientation determining the plunging angle, as determined by the stop, of the plunger tool or the plunger tool device is essentially maintained during the pivoting movement of the bracket about the first pivoting axis. This is preferably carried out in such a way that the plunger tool device and/or the stop guiding the latter is connected to a guiding transmission, formed as a parallelogram guide, for example.

Further, it is preferred if the stop for adjusting the plunging angle is adjustable. There are therefore several possible operating positions for the stop. Particularly preferred is a common adjustment device, central adjustment device, for adjusting the stops of all or a group of the tool units.

In the configuration according to the present invention, the centrifugal force is advantageously utilized for returning the plunger tool device when it is pulled out of the soil.

Further advantageously, a new curved guide of the plunger tool is achievable by reversing the orientation of the bracket.

In the previous approaches, wherein the bracket is linked at the front and the plunger tool trails behind, the movement curve of the plunger tool during driving of the soil treatment apparatus, this movement curve results from the overlap of the up and down movement of the plunger tool by pivoting the bracket and the driving movement in the driving direction, is chosen in such a way that straight plunging is possible when the bracket is relatively far up. As the bracket is pivoted further downward, the plunger tool is not only moved downward, but also in a movement component parallel to the driving direction. With a trailing plunger tool and a bracket extending rearwardly, pivoting of the bracket downward leads to a movement of the plunger tool in the driving direction in the lower range of the movement. This movement of the plunger tool in the driving direction resulting from the pivoting movement of the bracket is amplified by the movement of the soil treatment apparatus in the driving direction. In the prior-art movement, when the bracket is pivoted downward, the plunger tool is therefore moved downward with a large directional component to the front in the driving direction. The movement curve of the plunger tool therefore has a strong curvature overall. In other words, there are greater stresses on the plunger tool. This also prevents acceleration of the operating speed. In the lower angular range, the entire movement curve has its strongest curvature. During plunging, an overlap of the movement of the plunger tool in the driving direction initiated due to the angular displacement of the bracket with the driving movement occurs. This is why great force must be exerted for plunging.

In the approach according to the present invention, the driving direction and the orientation of the bracket are reversed. This is how a flatter movement curve results and a weaker curvature of the movement curve results overall, in particular during plunging. This is how much more vertical plunging can occur over the entire angular range of the bracket about the first pivoting axis. Breaking of the lower soil would then only be effected during withdrawal, where the hole has already been made and the plunging process has already been completed. As a result, substantially less force must be exerted. Overall, the lower forces to be exerted also mean that the operating speed can be increased.

In the prior-art systems having associated stops, the mass below the second pivoting axis had to be kept low due to the possible centrifugal forces. In the approach according to the present invention this is now no longer necessary. There is thus substantially more space below the second pivoting axis. Advantageous hollow-spoon operation is thus also possible. In hollow-spoon operation, tubular elements having an opening in the tip and having a top and lateral ejection channel are used as plunger tools. During plunging, earth penetrates into the tubular element and is then driven upward through the tubular element, where it is ejected again. In the previous orientation, in particular due to the little available space and the lateral stress already present during plunging due to the more strongly curved movement curve, it could happen that earth was compacted within the hollow spoon so that the entire tubular element was blocked and hollow-spoon operation was partially no longer possible in the desired manner.

With the orientation according to the present invention, on the one hand a flatter movement curve is achievable, so that lateral stresses are reduced on the ejection channel. On the other hand, an advantageous ejection channel can be formed on the plunger tool holder due to the larger available space.

In embodiments having a stop moved together with the free end section, the stop had to limit a plunger tool movement to the front in the driving direction. To keep the stop as compact and light as possible, an arrangement of the stop below the second pivoting axis used to be advantageous. In an advantageous embodiment of the invention, however, the stop is formed in such a way that a movement of the plunger tool device is limited against the driving direction. This can be formed in such a way, even in a simple configuration of the stop, that the stop is arranged above the second pivoting axis. For example, the above mentioned second lever arm of the lever element abuts there. Overall, it is possible to create more space below the pivoting axis, so that a greater variety of plunger tools, needing more or less space, is useable. Moreover, ejection channels for hollow-spoon operation can also be advantageously formed. The stop mechanics can thus generally be better kept free of dirt.

Moreover, due to the reversal of the direction of the pivoting movement of the plunger tool device about the second pivoting axis, a tensile spring can now be linked above the second pivoting axis and/or above the bracket. A construction can thus be achieved, wherein the tensile spring is more strongly tensed when the bracket is pivoted upward and has a tendency to be more relaxed when the bracket is moved downward. During withdrawal effected by pivoting the bracket upward the spring force of the tensile spring is thus amplified so that the plunger tool device is returned with greater force. In contrast, the tensile spring strength is weakened during downward pivoting, so that the plunger tool device is more easily moveable about the second pivoting axis when the plunger tool is plunged in and the soil treatment apparatus is moved further in the driving direction. The driving forces necessary are thus reduced and also make faster operation possible.

A further advantage of linking the bracket, extending from this linkage to the front as seen in the driving direction, at the back as seen in the driving direction, is that structural space is created thereby in front of the tool units as seen in the driving direction. This structural space can be used, for example, for attaching a soil roller with a relatively large diameter. In the previously known soil treatment apparatuses, a soil roller is already used in front of the tool units as seen in the driving direction, by means of which the soil treatment apparatus is supported on the ground. Due to the structural space thus created by displacing the linkage of the tool units, such a soil roller can be formed with a larger diameter, so that the soil treatment apparatus rolls with more comfort and can therefore also be moved at higher speeds. The soil roller can be used, for example, to adjust the height of the soil treatment apparatus above the soil, thus also allowing the plunging depth to be adjusted.

According to an advantageous embodiment of the invention, a swing formed as a bracket, on which a tool support or the like is linked, is mounted relative to the hitherto most widely used soil treatment apparatuses of the type in question, in mirror image, i.e., the swing points in the driving direction.

In the structure hitherto most widely used, the acceleration of mass (tool support and tines) used to have an effect in the direction "away from the stop" during the upward stroke (tine is lifted out of the soil). A return spring must additionally compensate this force.

In the mirror-image structure, by contrast, this acceleration contributes to damping and returning. The return spring can therefore be dimensioned smaller by an amount resulting from this force. Alternatively or additionally, higher speeds are possible.

Further advantages apart from the above mentioned "intelligent mass control" are:
- the structure is force-economizing, so that less driving power is needed,
- a larger front roller is possible,
- adjustment device and, if necessary, stationary handling means for handling the movement of the bracket and/or the relative movement of the bracket and the plunger tool device present on the chassis, are better accessible from behind,
- the distance between a plunger point of the plunger tool to an attachment point on a tractor or the like can be reduced,
- a hollow tine operation can be improved, since pivoting is reduced in the plunging stroke and therefore an ejection channel of the tine is no longer blocked by compressed matter.

A possible disadvantage of poorer accessibility of the tool carriers, to exchange plunger tools, for example, may be technically compensated by various means, such as a tilting option of the soil treatment apparatus or of parts thereof to the top or to the back.

These and other objects, features, aspects and advantages of the present invention will become apparent to those skilled in the art from the following detailed description, which, taken in conjunction with the annexed drawings, discloses preferred embodiments.

BRIEF DESCRIPTION OF THE DRAWINGS

Exemplary embodiments of the invention will be explained in more detail in the following with reference to the accompanying drawings, wherein.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
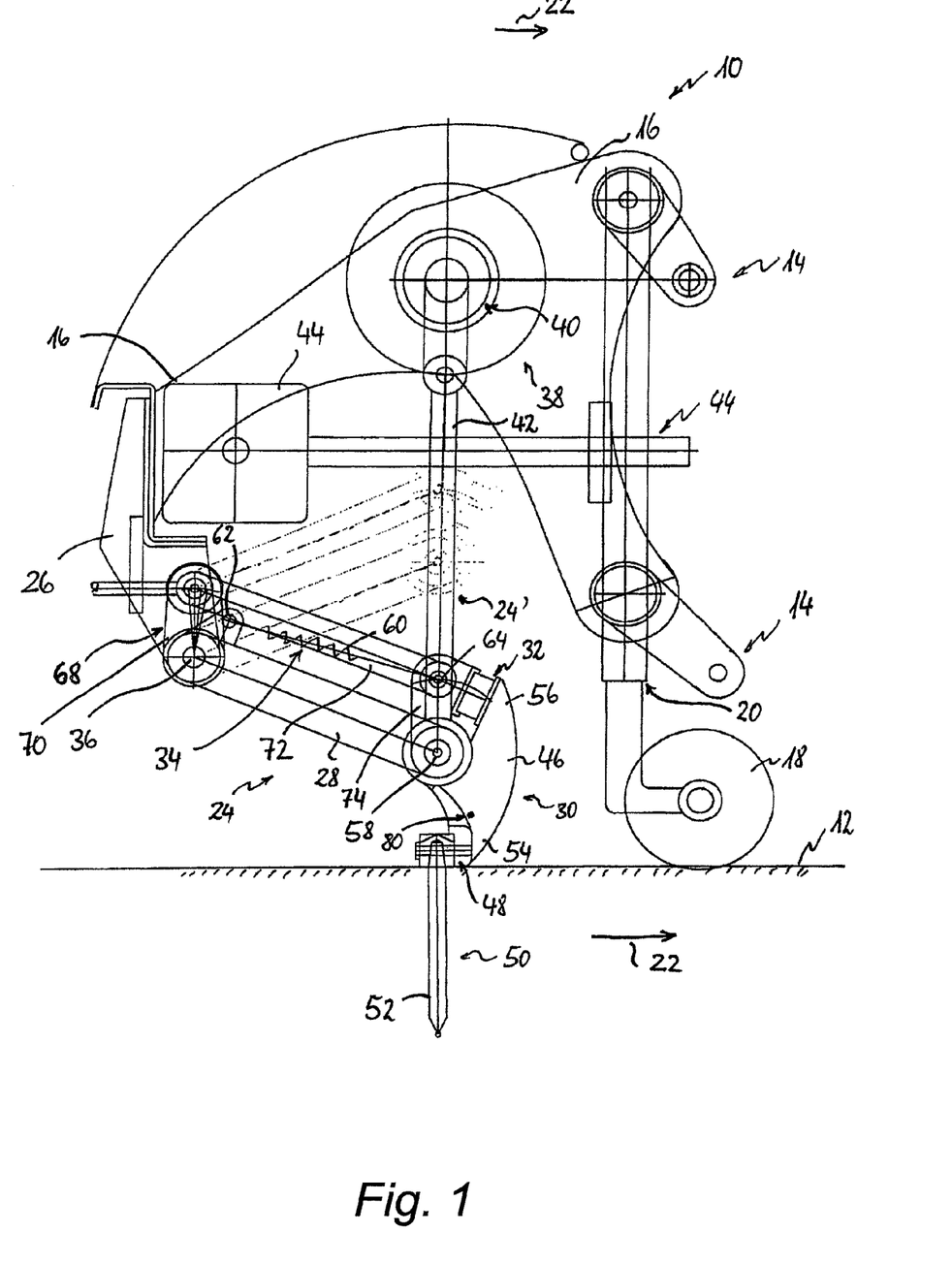
FIG. 1 is a schematic principle drawing of a first embodiment of a soil treatment apparatus as seen from the right side with respect to the driving direction.

FIG. 1 shows a side view of a first embodiment of a soil treatment apparatus 10. The soil treatment apparatus is driveable across soil 12. In the embodiment shown in FIG. 1 soil treatment apparatus 10 is linkable to a traction vehicle, such as a tractor (not shown) by means of ordinary linking means 14. Soil treatment apparatus 10 has a machine frame or chassis 16 on which linkage means 14 are attached. Chassis 16 is supported on soil 12 by a soil roller 18. Soil roller 18 is mounted on chassis 16 via a height adjustment device 20.

Arrow 22 shows the driving direction (forward driving direction). Driving direction 22 is from left to right in the view of FIG. 1. Transverse to driving direction 22, there is a row of a plurality of tool units 24 linked to chassis 16. Of tool units 24, only a first tool unit 24 is shown because of the lateral view and for better clarity. First tool unit 24 is shown in a fully lowered position. The broken lines schematically show a second tool unit 24' in a fully raised position. Tool units 24, 24' are linked in a rearward area of soil treatment apparatus 10 on a back frame element 26 as seen in the driving direction.

Each tool unit 24, 24' has a bracket 28, a plunger tool device 30 and a stop 32. In the embodiment of soil treatment apparatus 10 as shown in FIG. 1, further each tool unit 24 has a biasing device 34 for biasing plunger tool device 30 against stop 32.

Bracket 28 is linked to back frame element 26 pivotal upward and downward about a first, horizontal pivoting axis 36 extending across driving direction 32. A crank drive 38 comprising a crank shaft 40 and at least one driving rod 42 per each tool unit 24, 24', drives the up and down movement of bracket 28 about first pivoting axis 36. For this purpose, driving rod 42 is connected at one end with crank shaft 40 and at the other end with bracket 28 in a rotatable or pivotal manner, but essentially without play. By rotating crank shaft 40 bracket 28 is pivoted upward and downward about first pivoting axis 36. Crank shaft 40 is connectable to a power take-off point of the tractor (not shown) via a power take-off transmission 44.

Plunger tool device 30 has a pivotal partial element in the form of a lever element 46, a plunger tool holder 48 and an exchangeable plunger tool 50 held on plunger tool holder 48. Plunger tool 50 is a full tine with a sharp point in the example of FIG. 1. Lever element 46 has a first lever arm 54, on which plunger tool holder 48 is attached, and a second lever arm 56. Biasing device 34 acts on second lever arm 56 for biasing lever element 56 against stop 32. Herein, second lever arm 56 is formed for abutting against stop 32.

Lever element 46, and therefore the essential partial element of plunger tool device 30, is pivotally linked to the free end section of bracket 28 about a second pivoting axis 58. In soil treatment apparatus 10 shown, first pivoting axis 36 is behind second pivoting axis 58 as seen in the driving direction. In other words bracket 28, and essentially the entire tool unit 24, extends from back frame element 26 forward in the driving direction.

Biasing device 34 has at least one tensile spring 60 per each tool unit 24. Tensile spring 60 is linked to a first linkage point 62 arranged proximate to first pivoting axis 36 with its first end. With its other end, tensile spring 60 is linked to a second linkage point 64 arranged on second lever arm 56. Second linkage point 64 is disposed above the second pivoting axis, wherein the distance of second linkage point 64 from second pivoting axis 58 is greater than the distance of first linkage point 62 from first pivoting axis 36. Tensile spring 60 is thus increasingly tensed as bracket 28 is moved upward.

The stop is guided by a guiding transmission 66 forming essentially a parallelogram guide in such a way that its angular orientation about second pivoting axis 58 relative to chassis 16 stays about constant in the up and down movement of bracket 28. The orientation of lever element 46, when it is held in engagement with stop 32 by biasing device 34, thus also remains constant. The position of guiding transmission 66 and therefore the orientation of stop 32 can be adjusted by means of an angular position adjustment device 68. The plunging angle of plunger tool 50 guided by lever element 46 and stop 32 can thus be adjusted. The guiding transmission 66 also has a central adjustment element 70 pivotal about the first pivoting axis, the pivoting position of which is adjustable by means of angular position adjustment device 68. A guiding rod 72 acts on a boom of central adjustment element 70. Guiding rod 72 is linked to a pivoting element 74 with its other end, pivoting element 74 being pivotally linked at the free end section of bracket 28 about second pivoting axis 58, and on which stop 32 is formed. The boom of central adjustment element 70, guiding rod 72, and pivoting element 74, together with bracket 28 form the parallelogram guide, if any, of guiding transmission 66. For this reason the position of pivoting element 74 remains about parallel to the position of central adjustment element 70 even during the up and down pivoting movement of bracket 28.

Figure 2:
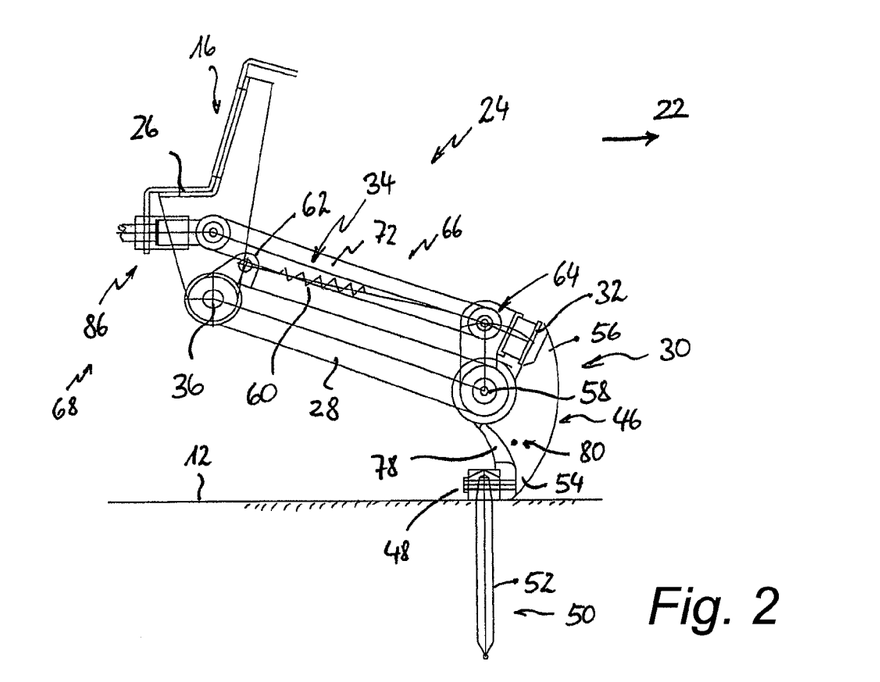
FIG. 2 is a side view of a tool unit used in a second embodiment of the soil treatment apparatus.

The above mentioned second attachment point 64 of biasing device 34 is formed on a lateral attachment of second lever arm 56 (hidden in the drawings and therefore not shown) in such a way that it coaxially coincides with the linkage of guiding rod 72 on pivoting element 74. A comparable tool unit 24 with plunger tool device 30 and stop 32 is individually shown again for illustration. Tool unit 24 of FIG. 2 is part of a second embodiment of the soil treatment apparatus distinguished from the embodiment shown in FIG. 1 only in that angular position adjustment device 68 is not a central adjustment element 70 but comprises individual angular adjustment device 86 present separately per each tool unit 24 on an individual basis for individually adjusting stop 32 of each tool unit 24.

Figure 3:
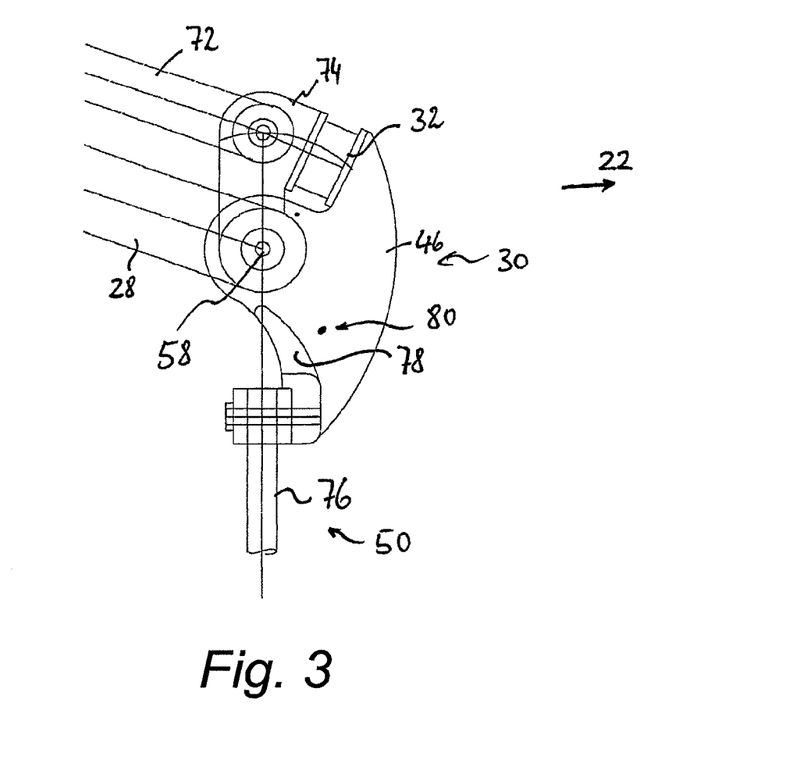
FIG. 3 is a detailed view of the front end area of the tool unit of FIG. 2 as seen in the driving direction.

FIG. 3 shows the front free end section of tool unit 24 with lever element 46 and stop 32 on pivoting element 74. As a plunger tool 50, a hollow tine or hollow spoon 76 is attached here on plunger tool holder 48. Above plunger tool holder 48, a redirecting surface 78 for redirecting soil material ejected through the upper end of hollow spoon 76 is formed on first lever arm 54.

Plunger tool device 30 is formed in such a way overall that lever element 46 with plunger tool holder 48 taken alone, but at least after the addition of a plunger tool 50 inserted in plunger tool holder 48, has a center of gravity 80 lying below second pivoting axis 58.

The operation of soil treatment apparatus 10 will be described in more detail with reference to FIGS. 4 and 6 wherein movement curve 82 of second pivoting axis 58 is illustrated, which results from an overlap of the up and down movement of bracket 28 with the movement of soil treatment apparatus 10 in driving direction 22. Reference numeral 82a indicates the downward movement portion of movement curve 82, and reference numeral 82b indicates the upward movement portion of movement curve 82.

In a general sense, the operation is carried out in such a way that plunger tool 50 is plunged into soil 12 during the movement of the tool unit from its highest position as shown with broken lines in FIG. 1 to its lowest position as shown with solid lines in FIG. 1. The plunging angle is defined by the orientation of stop 32. This position can be adjusted in advance by means of angular position adjustment device 68. If soil treatment apparatus 10 is then moved further in driving direction 22, plunger tool 50 is retained due to the resistance of soil 12, and lever element 46 is then pivoted about second pivoting axis 58 away from stop 32. Plunger tool 50 is thus pivoted within the soil, see the broken line view in FIG. 5, so that the soil is loosened below the soil surface. As driving is continued and bracket 28 is raised, plunger tool 50 is withdrawn from the soil. As plunger tool 50 leaves the soil it is brought back into engagement with stop 32 by the centrifugal force acting on plunger tool device 30 during pivoting of bracket 28 about first pivoting axis 36 and due to the tensile force of tensile spring 60.

Figure 4:
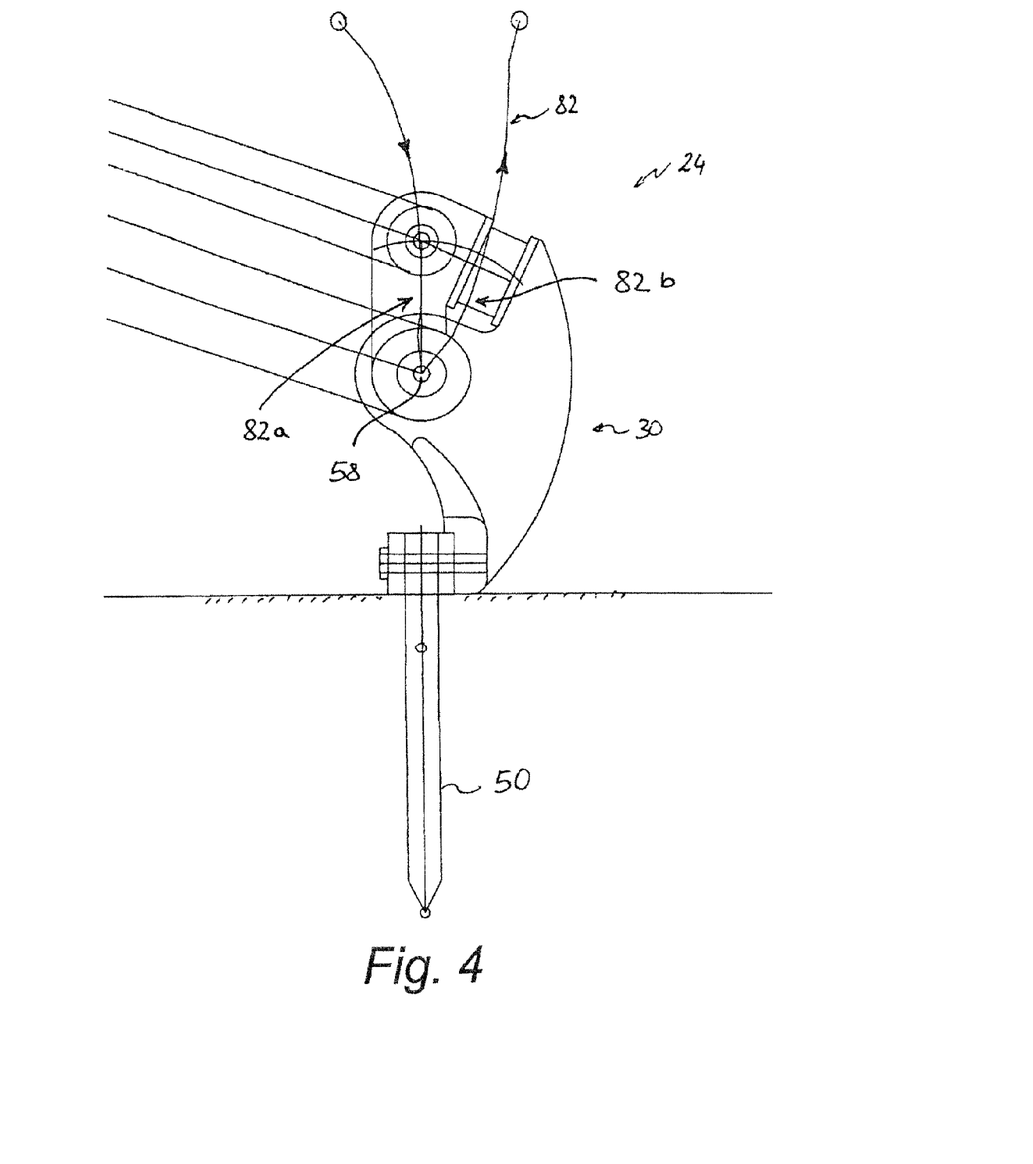
FIGS. 4 to 6 are three views comparable to FIG. 3 for explaining the overlapping movement sequence due to the driving movement of the soil treatment apparatus.
Figure 5:
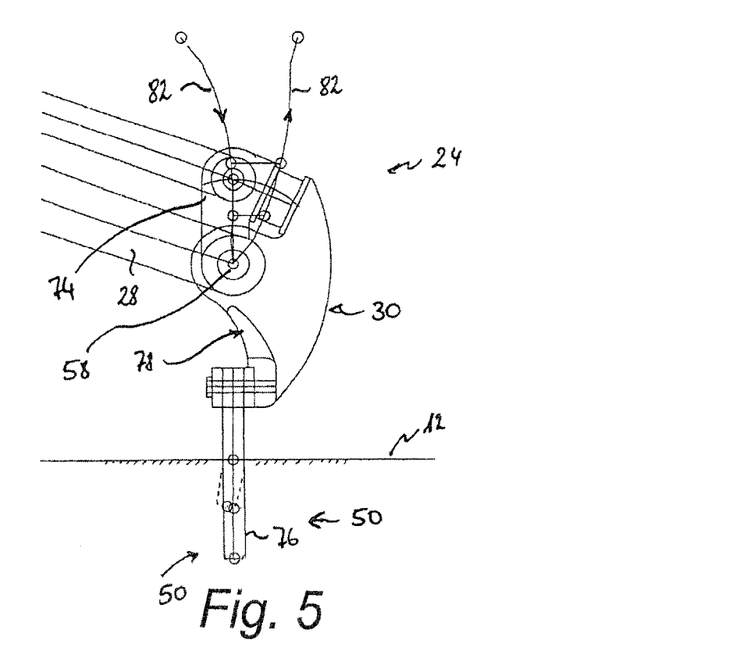
Figure 6:
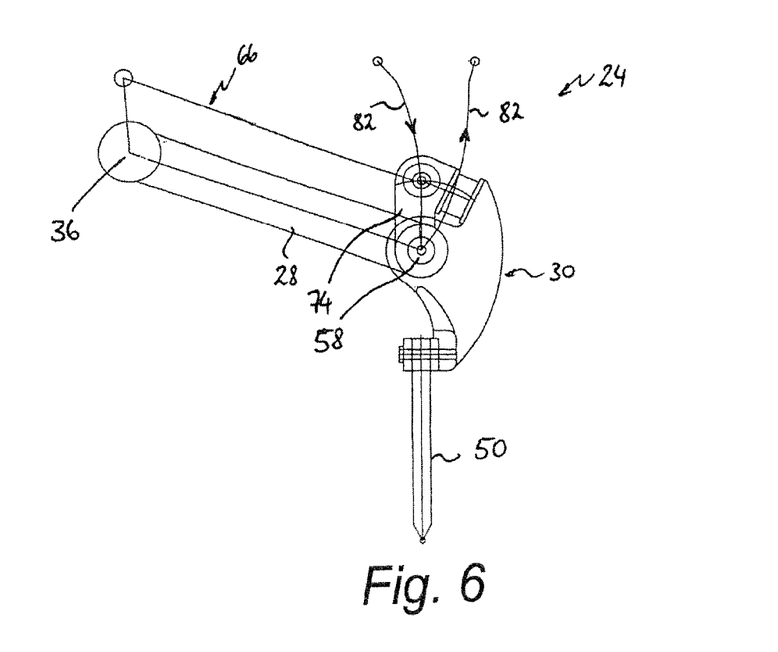

As can be seen from FIGS. 4, 5 and 6, the movement of plunger tool 50 in the direction component facing against the driving direction during the downward movement of bracket 28 and resulting from the pivoting movement of the bracket about first pivoting axis 36 is compensated by the movement of soil treatment apparatus 10 in the driving direction so that movement curve 82 is more rectilinear, in particular about vertical, to the soil during plunging (at 82a). The movement of plunger tool 50 in the directional component facing in the driving direction resulting during the upward pivoting of bracket 28 is amplified by the driving movement during the upward movement so that a greater pivoting movement with a plunged plunger tool and therefore better soil loosening is achievable by the upward movement at 82*b*. The more rectilinear plunging movement results in reduced power expenditure overall. There is a stronger pivoting movement only when plunger tool 50 is withdrawn, see the broken line view of FIG. 5, which does not need a driving movement by crank shaft 40, however, and wherein only lever element 46 is to be moved. Again, lower power expenditure is required for carrying out the pivoting movement.

As can be seen from the development of downward movement 82*a*, in particular in FIG. 4, the rectilinear movement relative to the soil, is present, in particular, in the lower half, i.e., approximately from the horizontal position of bracket 28. This is absolutely ideal for small working depths. The working depth can be adjusted by height adjustment device 20. For deep working depths the relative pivoting movement of tool unit 24 with respect to chassis 16 is added to the driving speed in the upper portion of upward movement curve 82*a*—above the horizontal position of bracket 28. Downward movement curve 82 has a slightly stronger curvature there, however at a low power expenditure, because plunger tool 50 is not or only superficially plunged in the soil. This effect can be made more pronounced by slightly advancing the tine by inclining the tine by a few degrees backward. This adjustment is carried out by angular position adjustment device 68. The tip of plunger tool 50 is thus slightly advanced.

In the embodiments shown in FIGS. 1 to 6, stop 32 is arranged above bracket 28. Stop 32 is thus outside the range of dirt.

Figures 7, 8:
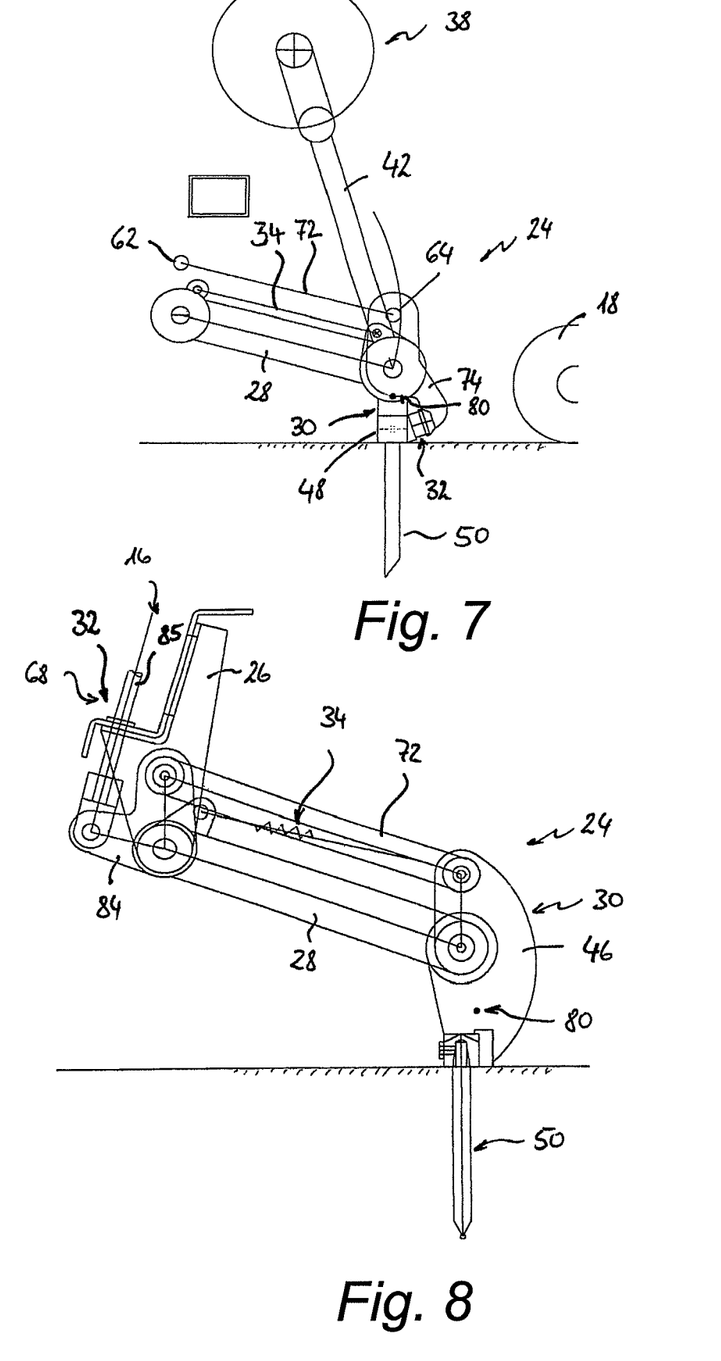
FIG. 7 is a principle drawing of a tool unit with a crank drive of a third embodiment of the soil treatment apparatus.
FIG. 8 shows a tool unit of a fourth embodiment of the soil treatment apparatus.

An embodiment as shown in FIG. 7 is also basically possible, however, wherein stop 32 is arranged below bracket 28. Pivoting element 74 is formed as a two-arm lever in the embodiment shown here.

A further embodiment shown in FIG. 8 is distinguished in that stop 32 is not arranged to be moved together with bracket 28, but is arranged outside the system moving up and down together with bracket 28 and is stationary on chassis 16. Plunger tool device 30 is then connected to guiding rod 72 in a playless manner, which transmits each relative movement of lever element 46 to bracket 28 via a redirecting element 84 into the system stationary with respect to chassis 16. For further details of this principle of transmitting the relative movements out of the moved system and handling and controlling these movements outside the moved system, reference is made in full to DE 10 2005 021 025 A1 and WO 2006/102869 A1. FIG. 8 shows the adjustment apparatus in a view comparable to the previous illustrations, wherein biasing device 34 holds lever element 46 indirectly via guiding rod 72 and redirecting element 84 in engagement on stop 82. When driving is continued lever element 46 and redirecting element 84 move clockwise in the view according to FIG. 8. Stop 82 is shown as a ring adjustable in height on a threaded rod 85. Several advantages of the arrangement shown here will be explained in more detail in the following.

As can be seen from FIG. 1, a lot of space is created in the area of soil roller 18 by linking tool units 24, 24' to back frame element 26 so that soil roller 18 could also be made substantially larger. Furthermore, soil roller 18 has been brought closer to plunger tool 50 so that the plunger tool is better adapted to the soil.

Due to the new curved guiding, movement curve 82, 82*a*, 82*b*, with the overlap of the downward pivoting movement with the driving direction, the maximum plunging depth of the plunger tool is now equal to the length of plunger tool 50. This is due to the fact that plunger tool 50 is generally plunged into the soil in a more vertical orientation. In a reversed arrangement of the tool units as it has previously been most widely used, plunger tool 50 is plunged at a more oblique angle due to the relative movement of soil treatment apparatus 10 with respect to soil 12 and the displacement of plunger tool 50 in a direction parallel to the driving direction due to the pivoting movement of bracket 28, which thus results in a maximum plunging depth only corresponding to a diagonal.

Linking in a backward area of chassis 16 allows the free end section of tool unit 24, 24' to be arranged more proximate to the tractor. The crank drive 38 can thus also be arranged more proximate to the tractor. Generally, a more proximate linking of the entire soil treatment apparatus 10 can be achieved on the tractor. This results in smoother driving. It is particularly advantageous in an embodiment of soil treatment apparatus 10 formed as an integral back portion of an automotive machine (not shown). Plunger tools 50 can thus be brought closer to the rear wheels to make better soil adaption possible.

As shown in FIG. 3, top ejection for a hollow spoon 76 is achievable by the arrangement shown. This becomes possible because plunger tool 50 can generally be displaced away from second pivoting axis 58 to the bottom. The thus effected displacement of center of gravity 80 is also advantageous for faster speeds in the arrangement shown here, but it would have been disadvantageous for faster speeds if the previous arrangement had been kept.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A soil treatment apparatus driveable in a driving direction across soil, comprising:
    a chassis; and
    a plurality of tool units, each of the plurality of tool units including
        a bracket having a first end section pivotally mounted on the chassis to be driven up and down about a first pivoting axis, and a second end section opposite the first end section,
        a plunger tool device being pivotally linked at the second end section of the bracket about a second pivoting axis, and
        a stop to limit movement of the plunger tool device, the stop being formed such that plunging is carried out at a predefined plunging angle, each stop of the plurality of tool units being separate from each other and each stop being arranged to be moved together with its respective bracket, the first pivoting axis being disposed behind the second pivoting relative to the driving direction, and the plunger tool device being linked and formed such that the plunger tool device is subjected to a centrifugal force in a direction toward a position limited by the stop whenever the bracket is pivoted about the first pivoting axis.

2. The soil treatment apparatus according to claim 1, wherein the plunger tool device includes at least one of a plunger tool and a plunger tool holder to hold the plunger tool, with the plunger tool or the plunger tool holder being pivotally linked on the bracket about the second pivoting axis.

3. The soil treatment apparatus according to claim 1, wherein a center of gravity of the plunger tool device and/or a partial element of the plunger tool device linked on the bracket pivotal about the second pivoting axis is disposed outside the second pivoting axis.

4. The soil treatment apparatus according to claim 3, wherein the center of gravity is below the second pivoting axis.

5. The soil treatment apparatus according to claim 1, further comprising a biasing device that is provided to bias at least one of the plunger tool devices in the direction toward its respective stop.

6. The soil treatment apparatus according to claim 5, wherein the biasing device includes a spring arranged to be moved together with the bracket.

7. The soil treatment apparatus according to claim 6, wherein the spring is a tensile spring arranged above or lateral to the bracket.

8. The soil treatment apparatus according to claim 1, wherein the plunger tool device includes a lever element pivotally linked on the bracket about the second pivoting axis with the lever element having a first lever arm and a second lever arm, and a plunger tool that is linkable or linked to the first lever arm.

9. The soil treatment apparatus according to claim 8, further comprising a biasing device that acts on the second lever arm.

10. The soil treatment apparatus according to claim 8, wherein each stop directly acts on its respective second lever arm.

11. The soil treatment apparatus according to claim 1, wherein each plunger tool device is guided and formed in such a way that an orientation determining the plunging angle of the plunger tool device is essentially kept constant during a pivoting movement of its respective bracket about the first pivoting axis.

12. The soil treatment apparatus according to claim 11, wherein each plunger tool device and each stop is connected to a guiding transmission formed as a parallelogram guide.

13. The soil treatment apparatus according to claim 1, wherein each stop is adjustable to adjust the plunging angle of its respective plunger tool device.

14. The soil treatment apparatus according to claim 13, wherein a common angular position adjustment device is provided to adjust the stops of all or of a group of the tool units.

15. A soil treatment apparatus driveable in a driving direction across soil, comprising:

a chassis; and a plurality of tool units, each of the plurality of tool units including a bracket having a first end section pivotally mounted on the chassis to be driven up and down about a first pivoting axis, and a second end section opposite the first end section, a plunger tool device being pivotally linked at the second end section of the bracket about a second pivoting axis, and a stop to limit movement of the plunger tool device, the stop being formed such that plunging is carried out at a predefined plunging angle, each stop of the plurality of tool units being separate from each other, the first pivoting axis being disposed behind the second pivoting relative to the driving direction, and the plunger tool device being linked and formed such that the plunger tool device is subjected to a centrifugal force in a direction toward a position limited by the stop whenever the bracket is pivoted about the first pivoting axis, wherein each of the plurality of tool units has a guiding rod arranged above and extending parallel to its respective bracket, each guiding rod having a first end arranged on a side of the guiding rod that is coupled to a chassis of the soil treatment apparatus and a second end arranged opposite the first end, each stop is formed on the second end of its respective guiding rod and is arranged to contact a side of the plunger tool device that faces in a direction backwards from the driving direction, and the plunger tool device has a center of gravity below the second pivoting axis.

16. A soil treatment apparatus driveable in a driving direction across soil, comprising:

a chassis; and a plurality of tool units, each of the plurality of tool units including a bracket having a first end section pivotally mounted on the chassis to be driven up and down about a first pivoting axis, and a second end section opposite the first end section, a plunger tool device being pivotally linked at the second end section of the bracket about a second pivoting axis, and a stop to limit movement of the plunger tool device, the stop being formed such that plunging is carried out at a predefined plunging angle, each stop of the plurality of tool units being separate from each other, the first pivoting axis being disposed behind the second pivoting relative to the driving direction, and the plunger tool device being linked and formed such that the plunger tool device is subjected to a centrifugal force in a direction toward a position limited by the stop whenever the bracket is pivoted about the first pivoting axis, wherein each of the plurality of tool units has a guiding rod arranged above and extending parallel to its respective bracket, each guiding rod having a first end arranged on a side of the guiding rod that is coupled to a chassis of the soil treatment apparatus and a second end arranged opposite the first end, and a pivoting element extend from and below its respective bracket, each stop is formed on a distal end of the pivoting element and is arranged to contact a side opposite to a side of the plunger tool device that faces in a direction backwards from the driving direction, and the plunger tool device has a center of gravity below the second pivoting axis.

17. The soil treatment apparatus according to claim 1, wherein each of the plurality of tool units has a guiding rod arranged above and extending parallel to its respective bracket, each guiding rod having a first end arranged on a side of the guiding rod that is coupled to a chassis of the soil treatment apparatus and a second end arranged opposite the first end, and the plunger tool device has a center of gravity below the second pivoting axis.

* * * * *